April 25, 1933.    B. SCHOLL    1,905,065
VALVE ACTUATING MEANS FOR AIR HEATERS
Filed Oct. 27, 1930    4 Sheets-Sheet 1
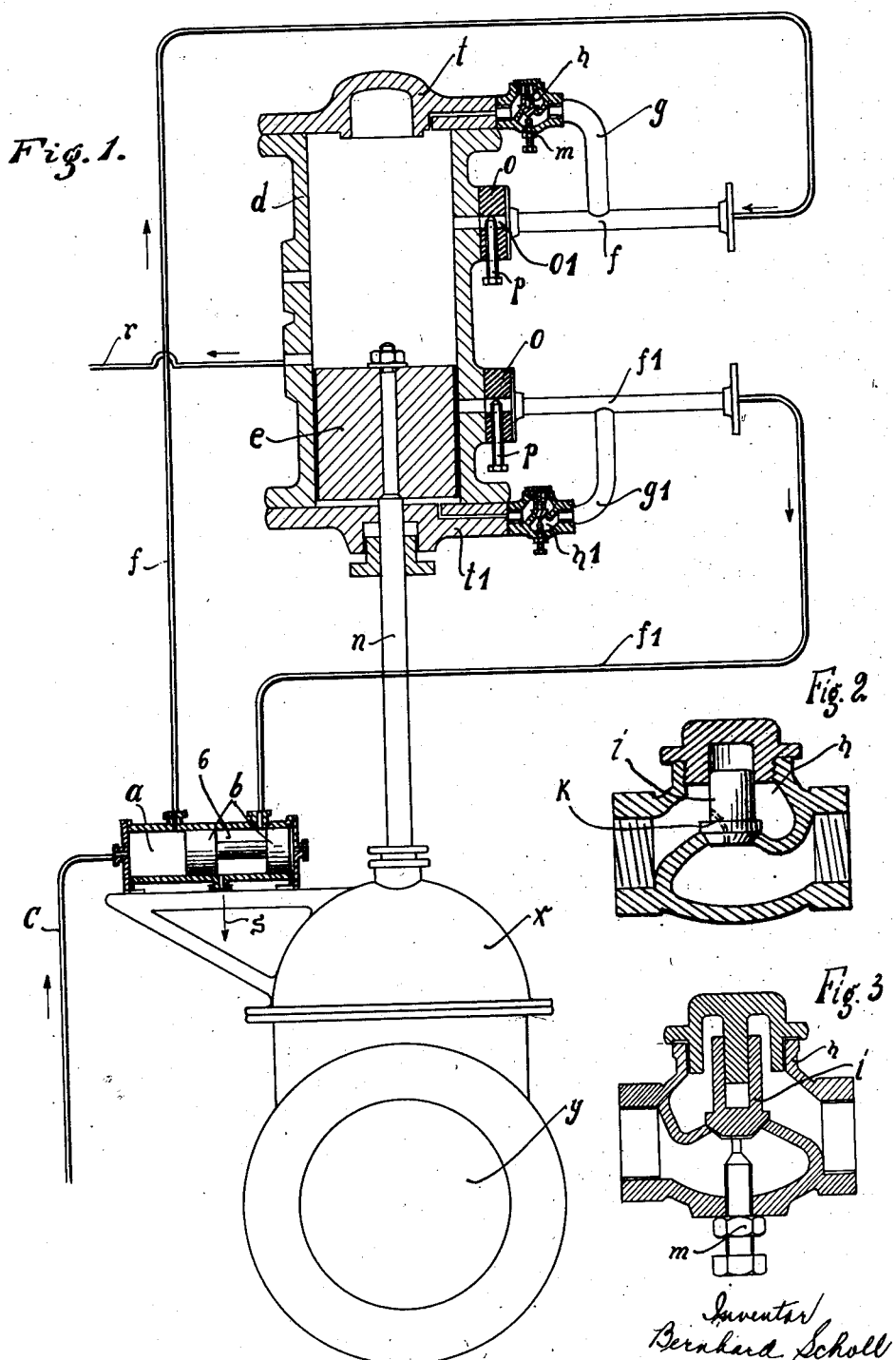

April 25, 1933. B. SCHOLL 1,905,065
VALVE ACTUATING MEANS FOR AIR HEATERS
Filed Oct. 27, 1930 4 Sheets-Sheet 2
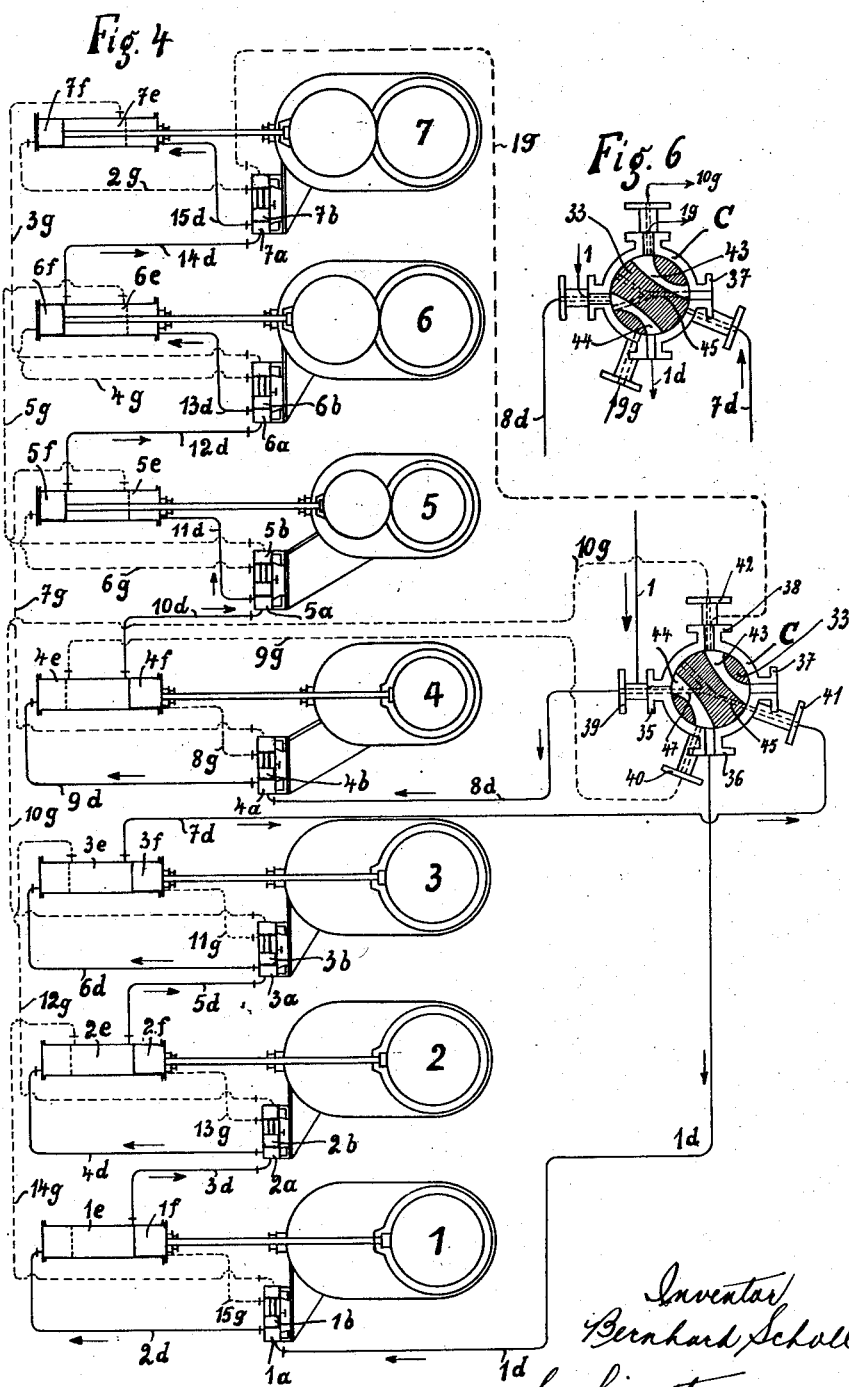

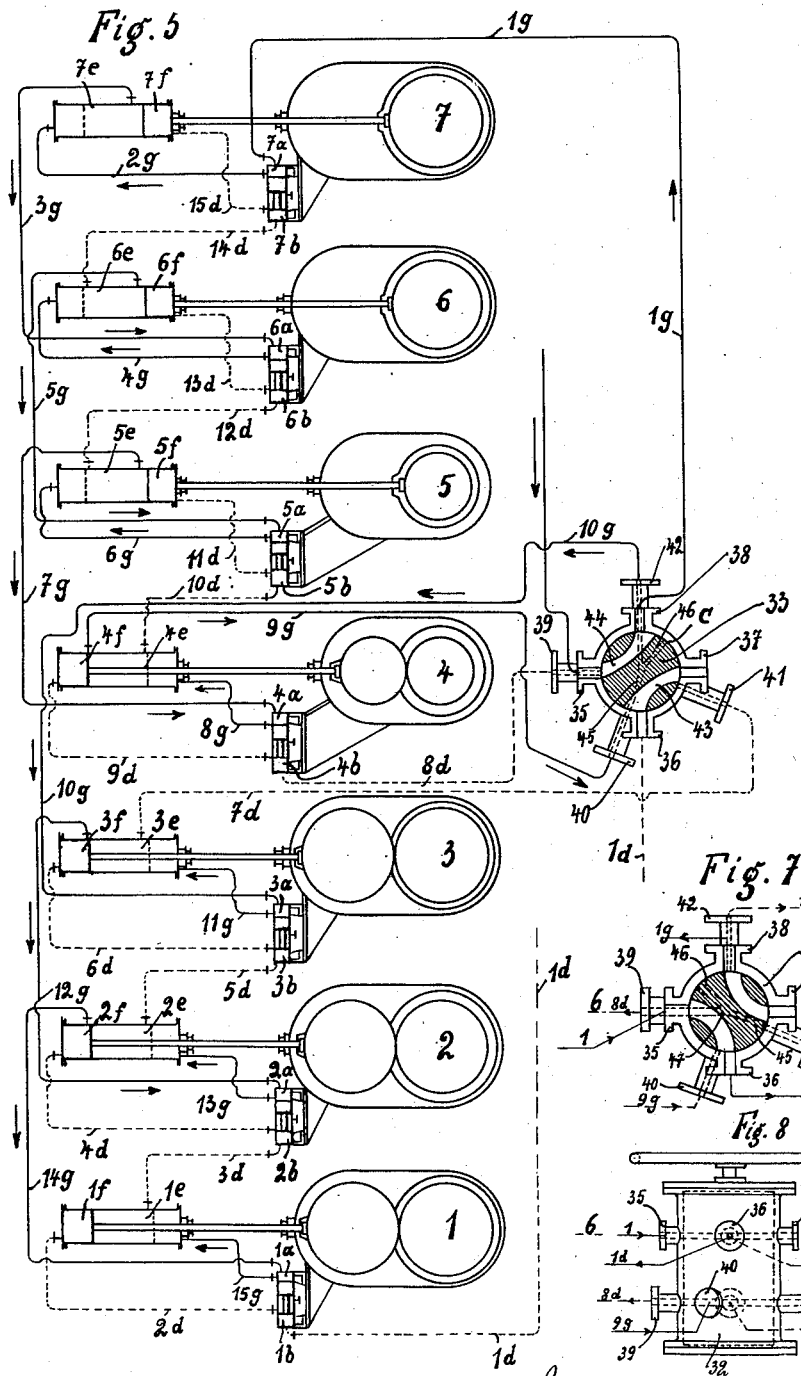

April 25, 1933.   B. SCHOLL   1,905,065
VALVE ACTUATING MEANS FOR AIR HEATERS
Filed Oct. 27, 1930   4 Sheets-Sheet 4
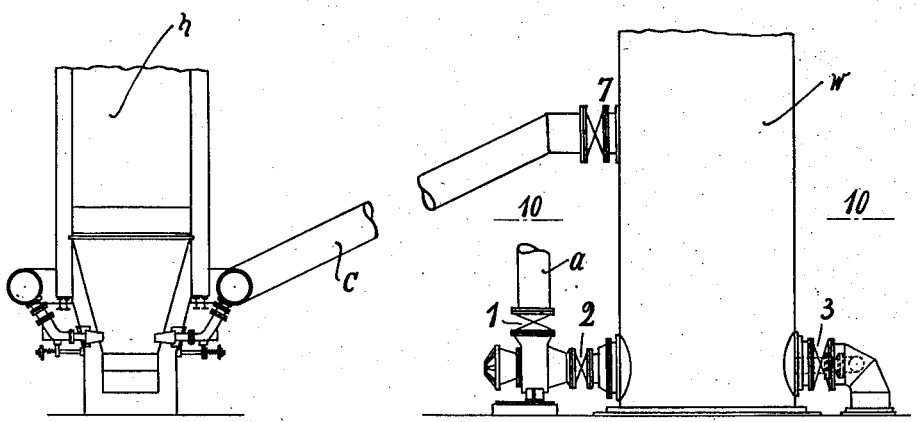
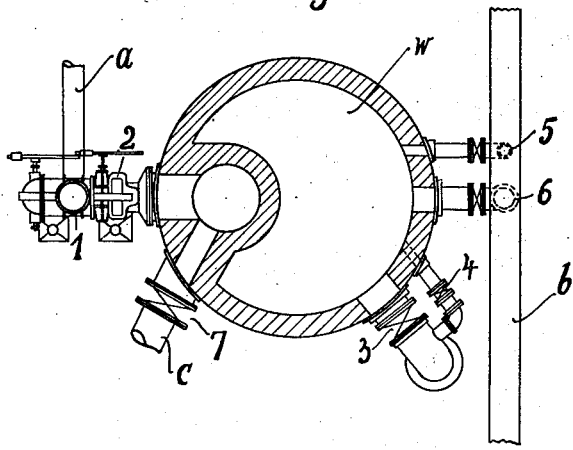

Patented Apr. 25, 1933

1,905,065

UNITED STATES PATENT OFFICE

BERNHARD SCHOLL, OF ROLSDORF NEAR DUREN, GERMANY, ASSIGNOR TO ZIMMERMANN & JANSEN, G. M. B. H., OF DUREN-RHLD., GERMANY, A COMPANY OF GERMANY

VALVE ACTUATING MEANS FOR AIR HEATERS

Application filed October 27, 1930, Serial No. 491,459, and in Germany December 16, 1929.

My invention relates to improvements in systems for controlling valves or gates of commercial plants such for example as gates of air heaters, and more particularly in systems of the type in which the valves are adapted to be opened or closed in regulated sequence by means of fluid operated pistons for controlling the flow of the pressure fluid by the actuating pistons themselves and by separate controlling pistons in such a manner that the various actuating pistons are operated automatically in a correct sequence and direction after main controlling members have been set. The object of the improvements is to provide a system of this type which is simple in construction and operation, and in which the length of the pipes for the pressure medium is reduced, and with this object in view my invention consists in connecting the separate controlling pistons and the actuating cylinders so that the separate controlling pistons are adjusted automatically by the stream of pressure medium supplied to the actuating cylinders so that it is not necessary to set the same by hand. In the preferred construction the controlling cylinders are arranged in series with the actuating cylinders in such a manner that the pressure medium first flows through the controlling cylinder for moving the piston thereof and then enters the corresponding actuating cylinder from which it flows to the next controlling cylinder. As the stream of pressure medium always first moves the actuating piston and thus exposes the path to the actuating cylinder it is possible in a simple manner to cause all the controlling pistons, after setting the main controlling member, to assume the position which corresponds to the selected direction of flow of the pressure medium.

For the purpose of explaining the invention an example embodying the same has been shown in the accompanying drawings in which the same reference characters have been used in all the views to indicate corresponding parts. In said drawings, Fig. 1 is an elevation partly in section showing a valve of a construction common in air heaters, the operating cylinder thereof and a controlling cylinder connected with said operating cylinder, Fig. 2 is a sectional elevation showing a check valve used in connection with the operating cylinder shown in Fig. 1, Fig. 3 is a similar sectional elevation showing a modification of the check valve, Fig. 4 is a diagrammatical plan view showing the valves and their controlling mechanism, the said controlling mechanism being set in position for successively operating all the valves.

Fig. 5 is a similar plan view showing the valves and their controlling mechanism in positions for being operated in reverse succession, Figs. 6 and 7 are sectional plan views taken on the line 6—6 of Fig. 8 and showing the main controlling valve in a position different from those shown in Figs. 4 and 5, Fig. 8 is an elevation showing the said main controlling valve, Fig. 9 is a diagrammatical elevation partly in section showing an air heater and a blast-furnace equipped with my improved system, and Fig. 10 is a sectional plan view taken on the line 10—10 of Fig. 9.

In Fig. 1 I have illustrated a valve or gate of a construction common in air heaters, the operating cylinder therefor, a controlling cylinder connected with said operating cylinder, and pipes for the gas controlled by said gate and cylinders. The said gate comprises a casing $x$ having a slide valve $y$ movable therein and connected by a stem $n$ with a piston $e$ mounted within a cylinder $d$. On a bracket connected with the casing $x$ the controlling cylinder $a$ is mounted in which a controlling piston $b$ is movable. The cylinder $a$ is connected by a pipe $c$ with a supply of pressure fluid, the said pressure fluid being adapted to shift the piston $b$ to the right and into position for permitting the pressure fluid to flow through the left hand part of the cylinder $a$ and a pipe $f$ to the operating cylinder $d$. Within the said operating cylinder the pressure fluid acts on the operating piston $e$ forcing the same downwardly and closing the gate $x, y$. After having acted within the cylinder the pressure fluid is delivered through a pipe $r$. The compressed air confined within the cylinder $d$ below the piston $e$ flows through a pipe $f^1$ to the cylinder $a$ and more particularly an annular chamber 6 provided by the piston $b$, and it escapes from the cylinder to the outer air through an outlet $s$. The pipes $f$ and $f^1$ connected with the operating cylinder $d$ are provided with means for insuring complete opening and closing of the gate $x, y$ and for preventing jamming of the said parts arriving in their end positions. As shown the said pipes $f$ and $f^1$ communicate with the cylinder $d$ at points remote from the ends thereof and they are formed with portions $g$ and $g^1$ respectively communicating with the cylinder through the heads $b$ and $b^1$ thereof. Thus when the piston $e$ moves upwardly or downwardly for opening and closing the gate $x$, $y$ it passes the pipes $f$ or $f^1$ before the gate arrives in its end position. Thus an air cushion is provided within the cylinder in front of the piston, the air escaping exclusively through the branch pipes $g$ or $g^1$. The said branch pipes are provided with check valves $h$ and $h^1$ respectively, which check valves are closed when the air flows in a direction from the cylinder and through the branch pipe, the said valves being constructed for permitting, when in closed position, a limited flow of the air. In the construction shown in Fig. 2 the valve cone $i$ is provided with a bore $k$, and in the construction shown in Fig. 3 a set screw $m$ is provided for preventing the valve cone $i$ from being placed tightly on its seat.

In the construction shown in Fig. 1 the portions of the pipes $f$ and $f^1$ are equipped each with a damming disk $o$ the bore $o^1$ of which is adapted to be obstructed more or less by a set screw $p$, the object of the said damming disks being to prevent too rapid movement of the piston when the pipes $f$ and $f^1$ are open. When connecting a plurality of operating cylinders for gates in series, as is shown by way of example in Figs. 4 and 5 the admission of the pressure fluid to the cylinders may be adapted to varying conditions by providing damming disks of the proper dimensions.

In Fig. 4 I have illustrated a system comprising seven gates and their operating mechanisms. The gates have received the characters 1 to 7, the controlling cylinders the characters $1a$ to $7a$, the controlling pistons the characters $1b$ to $7b$, the operating cylinders the characters $1e$ to $7e$ and the operating pistons the characters $1f$ to $7f$. The supply of pressure fluid such as compressed air to the controlling cylinders $1a$ to $7a$ is controlled by a main controlling valve $c$ the construction of which has been shown in detail in Figs. 4 to 8. As shown the said valve is in the form of rotary cylinder valve comprising a cylindrical casing 32 and a cylindrical valve body 33 mounted therein, the stem of the said valve body having a hand wheel 34 secured thereto. The valve casing 32 is provided with two sets of connections disposed axially one above the other, and the upper section comprises four connections 35, 36, 37 and 38, and the lower set comprises four connections 39, 40, 41 and 42. The valve body 33 comprises two ports 43 and 44 located in position for cooperating with the upper set of connections 35 to 38, and in position for cooperating with the connections 39 to 42 it is provided with a passage 45 having two branches 46 and 47. The upper set of the connections and ports for controlling the supply of the fluid to the controlling cylinders $1a$ to $7a$, and the lower set of connections 39 to 42 and the passage 45, 46, 47 are provided for throwing some of the gates and their actuating mechanisms into and out of operation.

The connection 35 is connected with a pipe 1 having pressure fluid supplied thereto, the connection 36 is connected by a pipe $1d$ with the bottom part of the controlling cylinder $1a$, and the connection 38 is connected by the pipe $1g$ with the top part of the controlling cylinder $7a$.

In the operation of the gates shown in Fig. 4 air is admitted through the pipe 1 and the two-way-cock $c$ and it flows in the direction of the arrows shown at the side of the pipe 1 and through the passage 44 of the plug 33 of the valve $c$ to the pipe $1d$ connected with the bottom part of the controlling cylinder $1a$. Therefore the controlling piston $1b$ is forced upwardly, so that the compressed air flows to the left hand end of the operating cylinder $1e$ through a pipe $2d$ thus forcing the operating piston $1f$ to the right and closing the gate 1.

While the piston $1f$ moves to the right the air confined within the right hand part of the cylinder $1e$ escapes through a pipe $15g$ and the annular passage provided by the pistons $1b$ to the outer air.

When the piston $1f$ arrives in its right hand end position shown in Fig. 4 the pressure fluid flows through a pipe $3d$ to the bottom part of the controlling cylinder $2a$, where it forces the controlling piston $2b$ upwardly. Now the pressure fluid flows through a pipe $4d$ to the operating cylinder $2e$ of the second gate, the piston $2f$ of the said cylinder being thrown to the right and in a direction for closing the gate 2, and the air escaping from the right hand part of the cylinder through a pipe $13g$.

In the same way the pressure fluid flows from each operating cylinder to the next controlling cylinder, so that also the pistons $3b$ to $7b$ are positively shifted in the correct sequence into the positions corresponding to the desired operations of the gates. The pipes connecting the controlling and operating cylinders have been indicated 5d, 6d, 11g, 7d, 8d, 9d, 8g, 10d, 11d, 6g, 12d, 13d, 4g, 14d, 15d, 2g.

It will be observed that the operating cylinder 3e is not directly connected with the controlling cylinder 4a, but through the pipes 7d and 8d connected with each other through the passage 45, 47 of the plug 33 of the main valve c.

When the pressure fluid has operated the last gate 7, which gate is open in the position of the parts shown in Fig. 4, and the piston 7f arrives in its left hand end position the supply of pressure fluid through the main valve c is interrupted.

In Fig. 5 I have illustrated the same system. But the flow of the pressure fluid has been reversed by means of the main valve c. Now the pressure fluid flows through the pipe 1, the passage 44 of the plug of the valve c, a pipe 1g and to the top part of the controlling cylinder 7a. The piston 7b is shifted downwardly, whereupon the compressed air flows through the pipe 2g to the left hand end of the operating cylinder 7e, thus shifting the piston 7f to the right and closing the gate 7. Simultaneously the space at the right of the piston 7f is connected with the outer air through the pipe 15d and the annular chamber provided by the piston 7b, so that the air confined within the right hand part of the cylinder 7f is free to escape. When the piston 7f arrives in its right hand end position the pressure fluid flows through the pipe 3g to the top part of the controlling cylinder 6a, where it forces the controlling piston 6b downwardly, so that the pressure fluid flows through the pipe 4g to the operating cylinder 6e of the gate 6.

In a similar way the piston 6f is forced to the right and in a direction for closing the gate, and the pressure fluid flows from each operating cylinder to the next controlling cylinder thus successively moving the controlling pistons 5b to 1b in the desired sequence and into the positions necessary for operating the gates. After the last gate has been operated and its operating piston has arrived in its end position the supply of pressure fluid to the controlling valve c is interrupted.

If it is not desired to operate the gates in the sequence described above, but only the first three gates 1, 2 and 3, while the other gates are not operated, as is sometimes necessary in the operation of blast-furnaces, the valve c is set into the position shown in Fig. 6, so that the pressure fluid flows through the pipe 1d to the first controlling cylinder and so on to the third operating cylinder. The pipes 7d and 8d adapted to connect the third operating cylinder through the valve c with the controlling cylinder 4a are disconnected because the bore 45, 47 of the plug of the valve c which in the position of the parts shown in Fig. 4 connects the said pipes is now in a different position shown in Fig. 6 in which it is out of communication with the pipes 7d and 8d.

Therefore the third gate which was in opening position is not closed, and the other gates 5, 6 and 7 remain closed.

Also when connecting the parts of the system in the manner illustrated in Fig. 5 it is possible to operate only a part of the gates. When setting the main controlling valve c into the position shown in Fig. 7 the pressure fluid flows only to the pipe 9g, the flow of the fluid through the said pipe being interrupted by the valve c. Therefore only the gates 7, 6, 5 and 4 are operated, while the gates 3, 2 and 1 remain in their original positions.

The valve c may be disposed at any suitable part of the plant and it may be used for interrupting other conduits. Fig. 8 shows the valve and the pipes connected therewith used in the example referred to above. The valve may be provided with other pipe connections. For example a pipe may be connected to the flange 37. The valve c may be disposed according to the conditions of the plant near the gates or remote therefrom, for example in a central station.

In Figs. 9 and 10 I have illustrated the use of my improved system in connection with air heaters for blast-furnaces. The gas is admitted through a gas pipe a, the gas gate 1, and the Cowper valve 2 to the air heater w where it is burned, the waste gas leaving the air heater through a blow-off valve 4 and a smoke valve 3. The four gas valves are open when the three air valves, viz. the side flue valve 5, a cold blast slide 6 and a hot blast valve 7 are closed. The valves 5 and 6 are connected with the cold air pipe b. The air heated within the Cowper is delivered through the valve 7 and it is supplied to the blast-furnace h through a pipe c. The object of the blow-off valve 4 is to reduce the pressure of the heater before opening the gas valve 3. The valve 5 has a similar object, in so far as it fills the air heater with air until there is no difference of pressure between the cold blast valve and the heater. After the pressure within the heater has been raised to that of the cold blast valve the slide 6 is opened.

When reversing the heater from gas to air the valves are respectively opened and closed in the following succession: 1, close the gas valve 1; 2, close the Cowper valve 2; 3, close the smoke delivery valve 3; 4, close the blow-off valve 4; 5, open the side flue valve 5; 6, open the cold blast slide 6; 7, open the hot blast valve 7.

When reversing the heater from air to gas the valves are reversed in the opposite succession. Of course, for example when the air heater is completely closed any other sequence of valve operation may be effected by means of the valve c. Further, the valve may be connected so that several air heaters are simultaneously reversed thereby.

I claim:

1. In a system for controlling valves or gates of commercial plants, the combination, with the members to be controlled, of actuating cylinders and pistons one for each of said members, fluid operated valves controlling the supply of motive fluid to said cylinders, tubular connections for connecting said valves and cylinders in series and so that after operation each piston connects the working chamber of its cylinder with the next valve for supplying the motive fluid from the working chamber thereto and each valve connects the chambers of the cylinder controlled thereby respectively with the supply and discharge of the motive fluid, and means for supplying the motive fluid to said valves for setting the same in positions for directing the motive fluid to said cylinders.

2. In a system for controlling valves or gates, the combination, with the members to be controlled, of controlling devices one for each of said members and each comprising, an actuating cylinder and its piston connected with the member, a controlling cylinder and a piston reciprocating therein, and tubular connections for supplying motive fluid to said controlling piston at the end for shifting its piston, for discharging the motive fluid, and for connecting the chamber of the actuating cylinder at opposite sides of its piston in the shifted position of the controlling piston respectively with the supply and discharge of motive fluid, tubular connections connecting the working chamber of each actuating cylinder at the end of the working stroke of its piston with the supply of motive fluid to the next controlling cylinder, and means controlling the supply of motive fluid to said controlling devices.

3. In a system for controlling valves or gates of commercial plants, the combination, with the members to be controlled, of actuating cylinders and pistons one for each of said members, fluid operated valves controlling the supply of motive fluid to said cylinders, means for supplying the motive fluid to said valves for setting the same in positions for directing the motive fluid to said cylinders, and means for disconnecting one of the sets of actuating and controlling cylinders from the fluid supply.

4. In a system for controlling valves or gates of commercial plants, the combination, with the members to be controlled, of actuating cylinders and pistons one for each of said members, fluid operated valves controlling the supply of motive fluid to said cylinders, means for supplying the motive fluid to said valves for setting the same in positions for directing the motive fluid to said cylinders, and means bodily connected with said means for supplying motive fluid for disconnecting one of the sets of actuating and controlling cylinders from the fluid supply.

5. In a system for controlling valves or gates, the combination, with the members to be controlled, of controlling devices one for each of said members and each comprising an actuating cylinder and its piston connected with the member, a controlling cylinder and a piston reciprocating therein, and tubular connections for supplying motive fluid to said controlling piston at the end for shifting its piston, for discharging the motive fluid, and for connecting the chambers of the actuating cylinder at opposite sides of its piston in the shifted position of the controlling piston respectively with the supply and discharge of motive fluid, tubular connections connecting the working chamber of each actuating cylinder at the end of the working stroke of its piston with the supply of motive fluid to the next controlling cylinder, means controlling the supply of motive fluid to said controlling devices, and a valve bodily connected with said means for supplying motive fluid and included in the tubular connection between one of said actuating cylinders and the next controlling cylinder.

6. In a system for controlling a valve or gate, the combination, with a member to be controlled, of an actuating cylinder and a piston reciprocating therein and connected with said member. a controlling cylinder and a piston reciprocating therein, means to supply motive fluid to said controlling cylinder at the end for shifting its piston and to discharge the motive fluid, and tubular connections between said cylinders adapted, in the shifted position of said controlling piston, to connect the chamber of said actuating cylinder at opposite sides of its piston respectively with the supply and discharge of motive fluid, the tubular connection connecting said actuating cylinder with the discharge comprising two branches connected with said actuating cylinder respectively at its end and at a part remote from its end, and the branch connected with the cylinder at a part remote from its end comprising an exchangeable checking disk.

In testimony whereof I hereunto affix my signature.

BERNHARD SCHOLL.